UNITED STATES PATENT OFFICE.

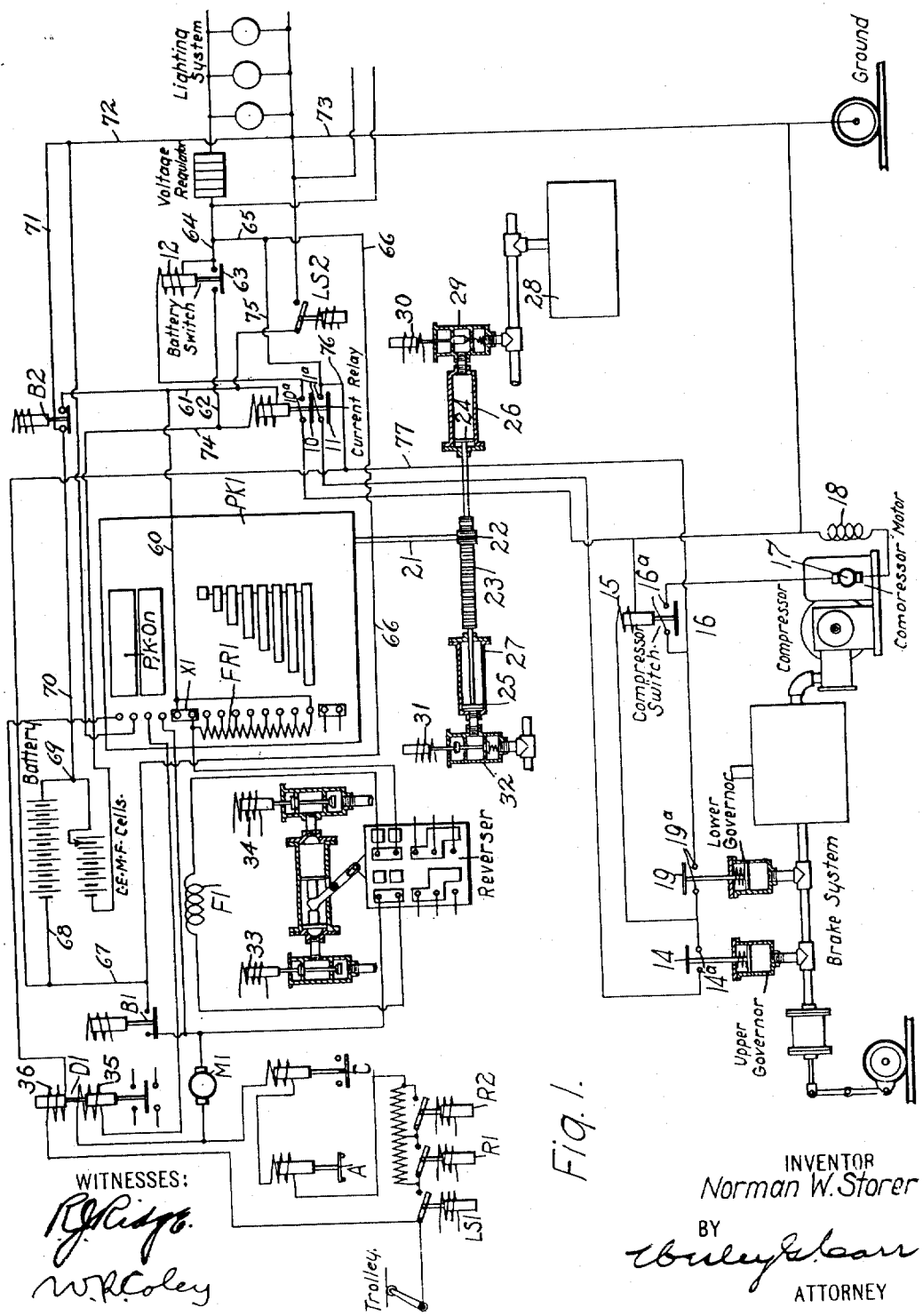

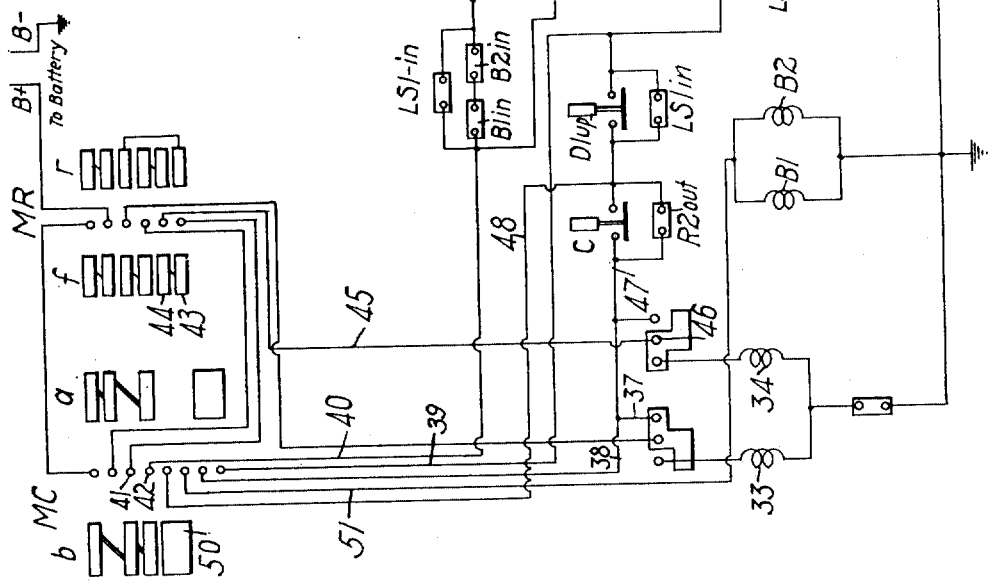

NORMAN W. STORER, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,231,664.  Specification of Letters Patent.  Patented July 3, 1917.

Application filed July 24, 1914. Serial No. 852,797.

*To all whom it may concern:*

Be it known that I, NORMAN W. STORER, a citizen of the United States, and a resident of Pittsburgh, in the county of Allegheny and State of Pennsylvania, have invented a new and useful Improvement in Control Systems, of which the following is a specification.

My invention relates to control systems, and it has special reference to relatively high-voltage direct-current regenerative control systems for railway motors.

One of the objects of my invention is to simplify and improve the arrangement of circuits and the operation of control systems of the above indicated class and to provide a high-voltage control system in which the main motor current may be utilized for operating the auxiliary apparatus, such as motor-driven compression, lighting and control systems during acceleration, and in which the regenerated current may be employed for a similar purpose during the regenerative period of the motors.

A further object of my invention is to provide a storage battery or other energy-accumulator which shall, under normal operating conditions, be connected in circuit with the driving motors and shall be charged by the motor current, except at such times as the motor current is utilized for operating the auxiliary apparatus, and which shall be employed for field-current regulating purposes during regenerative braking of the railway vehicle, thus simplifying and decreasing the cost of the control system by employing a single storage battery for performing the double function.

When the usual 600 volt direct-current railway system is employed, the auxiliary apparatus is customarily operated directly from the trolley conductor.

In recent years, the development of 1200 and 1500 volt systems has been accomplished, and, in such cases, the auxiliary apparatus, such as the lighting and control circuits and the motor-compressors, have received their energy from a so-called "dynamotor" which serves to deliver a low voltage for these purposes, or from motors operated directly from the high trolley voltage. Motor-generator sets have also been proposed for supplying energy to the auxiliary apparatus.

However, the use of high-voltage dynamotors and motor generator sets is undesirable under certain operating conditions, and result in difficulties in some classes of service and with certain types of equipments.

It is with the intention of improving operation and providing an economical combined propelling and regenerative control system that I have devised my present system, and also, for the purpose of meeting the demands of systems of even higher voltage, such as 2400, 3600 or 4800 volts, which are being contemplated for future railway development, particularly for high-speed interurban service and steam railroad electrifications.

According to my invention, in so far as motor acceleration and propulsion are concerned, I propose to employ a storage battery which shall normally be connected either in series relation with all of the driving motors and be traversed by the entire motor current, or be connected in series circuit with a portion of the motors, in which case it will be affected only by a proportionate part of the total motor current. The specific location of the storage battery, with respect to the main motor circuits, will depend largely upon the voltage of the system and the characteristics of the service.

If a trolley voltage of 3600 volts be employed, the main motor current will be comparatively small, and, if a storage battery taking normally 100 volts is used, which is less than 3% of the line voltage, the current will be approximately the proper amount for driving the motor-compressor and furnishing energy for the lighting and control circuits and other auxiliary apparatus.

For example, the full-load current for the driving motors of a 50 ton car for 3600 volt service will be about 100 amperes. A 100 volt compressor motor for such an equipment will take from 50 to 60 amperes and the average running current for the car will be approximately 60 amperes. It will, therefore, be seen that the average motor current is of substantially the proper value for operating the auxiliary apparatus and that the battery itself will only have to take care of the difference between the main motor current and the current required by the auxiliaries.

The capacity of the battery should be sufficient to operate all of the auxiliaries for one or two hours, if necessary, but, in ordinary service, the battery would furnish only a small part of the current used by the auxiliaries and would intermittently be charged and discharged by small amounts, the main motor current being utilized, almost exclusively, for the auxiliary apparatus.

Moreover, instead of operating the compressor to pump up the braking system when the driving motors are at a standstill, as is customarily done, the motor-compressor is arranged to be operated, as far as possible, when the driving motors are running, and to be operated when the car is at rest only when the pressure has fallen to a predetermined minimum value. In such an event, of course, the battery would supply the necessary energy for operation.

The above-mentioned main-circuit accelerating connections are fully set forth and claimed in my co-pending application, Serial No. 781,742, filed July 29, 1913.

In order to adapt the system of control to regenerative retardation, I provide means for suitably arranging the motor circuits and for connecting the above-mentioned storage battery in parallel relation to the field-magnet winding of the braking motor and a field-regulating resistor, which is automatically varied in accordance with changes in motor speed or supply circuit voltage, as hereinafter more fully set forth.

To secure a maximum braking effort without injuring the electric motors or the other apparatus with which the vehicle is equipped, I provide automatic means, in the form of a differential relay switch, for automatically connecting a propelling motor to the supply circuit when the electromotive force generated at its terminals bears a predetermined relation to the voltage of the power supply circuit.

I desire it to be understood that, whereas, for simplicity and clearness, I have shown my invention as embodied in a simple and familiar system, the invention is readily applicable to various other types of control systems, as will be evident to those versed in railway practice.

In the accompanying drawings, Figure 1 is a diagrammatic view of the main motor circuits and the circuits of certain auxiliary apparatus in a system of control embodying my invention; and Fig. 2 is a diagrammatic view of an auxiliary control system for operating the main system shown in Fig. 1.

Referring to Fig. 1 of the drawings, the system here shown comprises a supply-circuit conductor which, for convenience is marked "Trolley"; a return circuit conductor which is marked "Ground"; an electric motor having an armature M1 and a field magnet winding F1; a pair of line switches LS1 and LS2; a plurality of resistor sections respectively adapted to be short-circuited by switches R1 and R2; a field-regulating resistance FR1 which is provided with a short-circuiting switch X1; an accumulator or storage battery marked "Battery", that is connected in series circuit with the motor under normal propelling conditions; switches B1 and B2 for connecting the battery in its regenerative circuit; a controller for governing the field-regulating resistance, marked PK1; a plurality of limit switches A and C, a differential relay switch D1, reversing switch marked "Reverser"; translating device marked, "Lighting System" connected in multiple to said "Battery"; a switching device marked "Voltage Regulator", and of any suitable type for controlling the voltage of said "Lighting System", a "Compressor" adapted to create a predetermined fluid pressure in a system of a common type marked "Brake System"; a "Compressor Motor" for driving said "Compressor"; a switching device marked "Compressor Switch" in circuit with the "Compressor Motor"; a battery of counter electro-motive cells (C. E. M. F. cells) in multiple circuit with said "Battery" for controlling the battery charging current; a switch marked "Battery Switch" in series circuit with said "Battery" and in multiple with said C. E. M. F. cells; an electro-responsive switching device marked "Current Relay" dependent for its operation upon the flow of motor current and a plurality of pressure governors respectively marked "Upper Governor" and "Lower Governor" for controlling the operation of the "Compressor Switch" in accordance with predetermined pressure conditions for the "Brake System".

The operation of the system with reference to the main circuits only will first be discussed and, subsequently, the control circuits, by which the desired circuit changes are accomplished, will be traced.

The "Battery" and "Current Relay" are connected in series circuit with the driving motor and are thus traversed by the total motor current.

Assuming that it is desired to accelerate the motor, the switch LS1 is closed, thereby connecting the motor and the resistors R1 and R2 in series across the line. The resistors are then gradually short-circuited, dependent upon the limit switch A, in accordance with familiar practice, thus impressing full voltage upon the motor.

Assuming that the driving motors are in operation and that the pressure of the "Brake System" is at its normal value, the operation of the system is as follows:

The "Current Relay" is energized by the motor current, which initially passes through the C. E. M. F. cells, and its switch members 10 and 11 are raised into contact with their coöperating contact terminals 10ª and 11ª. By reason of the engagement of contact members 10 and 10ª, energy is supplied to the energizing coil 12 of the "Battery Switch" from the positive side of the "Battery" to the return circuit conductor "Ground." The "Battery Switch" is thus closed, thereby connecting the "Battery" in multiple circuit with the C. E. M. F. cells, after which the main motor current supplies the "Battery," C. E. M. F. cells and auxiliaries, in the following manner.

One circuit is established from the switch X1 through conductors 60 and 61, actuating coil of the Current Relay, conductor 62, the auxiliary contact members 63 of the Battery Switch, conductors 64, 65, 66, 67 and 68, the Battery, junction-point 69 with the "C. E. M. F. Cells," conductors 70, 71, 72 and 73 to the negative conductor, Ground.

Another circuit is established from conductor 61, through the actuating coil of the Current Relay, conductor 74, the "C. E. M. F. Cells," and the junction-point 69, from which point the circuit is completed as already described.

A third set of circuits is completed from conductor 65, through conductors 75, 76 and 77 to the Brake System and the Compressor, as set forth more fully later. The Lighting System is permanently connected between the conductor 64 that is connected to the positive side of the Battery, and conductor 73 that is connected to ground.

If, while these conditions obtain, the pressure of the "Brake System" falls to a value for which the "Upper Governor" is adjusted, its switch member 14 is permitted to drop and complete a circuit from the positive side of the "Battery" through coöperating contact members 11 and 11ᵃ of the "Current Relay," coöperating contact members 14 and 14ᵃ of the "Upper Governor," and energizing coil 15 of the "Compressor Switch" to the return circuit "Ground." Thus the coil 15 is energized, and the "Compressor Switch" closed. In so doing, a circuit is completed from the positive side of the "Battery" through switch members 16 and 16ᵃ of the "Compressor Switch," and armature 17 and field magnet winding 18 of the "Compressor Motor" to the return circuit. The main motor current, which serves to charge the "Battery" prior to the closure of the "Compressor Switch," is thus shunted through the circuit just traced and is utilized, at least in part, to operate the "Compressor Motor" for the purpose of driving the "Compressor" and pumping up the "Brake System" to its normal value.

During this operation, the "Battery" may continue to be charged by a small amount of current or may be called upon to supply a portion of the energy for the "Compressor Motor," dependent, of course, upon the amount of current taken by the driving motor at this particular time.

As soon as the predetermined normal pressure is restored in the "Brake System," contact members 14 and 14ᵃ of the "Upper Governor" are disengaged and the "Compressor Switch" is opened to disconnect the "Compressor Motor."

The circuit through the energizing coil 15 of the "Compresssor Switch" is interlocked through the contact members 14 and 14ᵃ of the "Upper Governor" and also through contact members 11 and 11ᵃ of the "Current Relay." It is, therefore, evident that, under normal operating conditions, the "Compressor Motor" can be operated only when the driving motors are taking current and thereby holding the "Current Relay" switches in engagement.

If the driving motors are at rest, the "Battery Switch" can not be closed, and, if the pressure of the "Brake System" falls to a minimum safe value for which the "Lower Governor" is set, its contact members 19 and 19ᵃ complete a circuit through the energizing coil 15, and the "Compressor Switch" is closed to deliver energy from the "Battery" for operating the "Compressor Motor" and "Compressor." In fact, the "Lower Governor" will act to close the "Compressor Switch" irrespective of the condition of the driving motors.

In the manner hereinbefore explained, the "Battery" is normally charged during operation by the greater portion of the motor current, except at such times as the motor current is utilized for driving the motor-compressor set. The "Battery" is employed for operating the "Compressor Motor" and other auxiliaries when the vehicle is at rest, and also for supplying a certain amount of current under conditions when the motor current is insufficient for the purpose.

The "Battery," therefore, is subjected to periods of charge and discharge, and the C. E. M. F. battery is set for the particular service in which the equipment is operated in order that the total charging current for a given period shall be sufficient to maintain the "Battery" at substantially full-charge conditions without subjecting it to excessive charging currents or excessive overcharge. While a battery of C. E. M. F. cells is preferably employed for the regulating purpose just recited, it will be understood that a resistor or any other suitable device may be used, if desired.

For regenerative braking, the field magnet winding of the motor is first reversed with respect to the armature, and the switches B1 and B2 then close, followed by the actuation of the controller PK1 to its braking positions. The battery is thus connected across the motor field magnet winding and the field-regulating resistance FR1, the resistance being varied by the controller to vary the armature voltage.

The line switches LS1 and LS2 are automatically dependent upon the differential relay switch D1 and, consequently, when a predetermined relation exists between the voltage generated at the terminals of the motor armature and the voltage of the line, the motor is automatically connected to the line by the closing of the line switches. The controller PK1 is thereupon automatically regulated, as hereinafter pointed out, to so govern the field-regulating resistance as to maintain a substantially constant braking current. This obviously involves the gradual exclusion of the resistance to maintain a substantially constant generated voltage at the terminals of the motor as its speed decreases.

The PK controller is intended to be representative of any suitable means for automatically governing the field-regulating resistance, and I do not wish to be limited to any specific control apparatus.

The PK controller comprises a plurality of contact fingers which are connected to intermediate points in the field-regulating resistance; and suitable contact segments which are adapted to successively engage the fingers and gradually short-circuit the resistance in a well-known manner.

The controller is preferably in the form of a drum, which is shown developed into a single plane, in accordance with a familiar practice, and is provided with a shaft 21 to which a pinion 22 is secured. The drum is actuated by a rack 23 which meshes with the pinion 22 and is connected, at its respective ends, to pistons 24 and 25 which operate in cylinders 26 and 27. Fluid pressure is normally admitted from a tank or reservoir 28, through an electromagnetically controlled valve 29, to the cylinder 26, when an actuating coil 30 for the valve is deënergized, and fluid pressure is admitted from the tank or reservoir to the cylinder 27 when an actuating coil 31 for the other magnet valve 32 is energized.

The arrangement of parts is such that, if both magnet valves are deënergized, the fluid pressure will be admitted through the valve 29 to the cylinder 26 and will so actuate the piston 24 and the rack 23 as to throw the PK drum to its "off" position.

If magnet valve 32 is energized, fluid pressure will be admitted to the cylinder 27, but no motion of the drum will result, inasmuch as the pressures are then balanced on the two sides of the piston member. A motion of the drum may, however, be produced by subsequently energizing the coil 30 of the valve 29, since, by this means, the valve 29 will cut off the supply of pressure from the reservoir and will open its exhaust port. The drum may be stopped at any position by merely deënergizing the coil 30, and it may be returned to its off position by merely deënergizing both of the coils 30 and 31.

The valve magnet 32, which, when energized, is open to admit fluid pressure to the cylinder and, when deënergized, is closed to exhaust air from the cylinder, will hereinafter be referred to as a "standard" valve magnet while the valve magnet 29 which is open to admit fluid pressure to the cylinder, when deënergized, and exhausts the air from the cylinder, when energized, will hereinafter be referred to as "inverted" valve magnet.

The "Reverser" may be of any suitable type, but preferably comprises a drum section which is adapted to occupy two positions, one for forward and the other for reverse operation of the vehicle. It is preferably pneumatically operated, and is controlled by valves having actuating coils 33 and 34.

The limit switch A is opened, when energized above a predetermined value, and the switch C is closed, when energized above a second predetermined value.

The differential relay switch D1 is provided with a coil 35 which, when energized, tends to raise it, and a coil 36 which tends to hold it down.

The coil 35 is connected in shunt relation to the armature M1 when the PK1 drum occupies any "on" position by reason of the interlocking contact member marked "PK on" that is disposed in the circuit of the coil.

The coil 36 is similarly connected across the supply circuit during the "on" position of the PK drum by reason of the inclusion of an interlock marked "PK on" in the coil circuit.

Referring to Fig. 2 of the drawings, the control circuits here shown are governed by a master controller MC adapted to occupy an "off" position, an accelerating position $a$ and a braking position $b$; and a master reverser MR adapted to occupy a forward position $f$ and a reversing position $r$.

Energy may be supplied to the control circuits from any suitable source, preferably the Battery shown in Fig. 1, having a positive terminal which, together with its connected conductors, is marked B+ and a negative terminal which, with its connected conductors, is marked B—.

Assuming that the master controller is moved from its "off" position to its accelerating position, and that the master reverser and main reverser occupy their forward running positions, a circuit is established from the B+ terminal of the battery, through the master reverser, master controller, main reverser, and conductors 37, 38 and 39 to the coil of the line switch LS1 and from conductor 39, through interlock B2-in and the coil of the switch LS2, thereby closing the switches and connecting the motor in series with the resistors R1 and R2 the Current Relay and the C. E. M. F. Cells across the supply circuit.

A second circuit is thereupon established from the master controller, through conductor 40, interlock marked "LS1-in," contact members of the switches D1 and A, a second interlock marked "LS1-in" and then progressively and dependent upon the limit switch A, to the coils of the switches R1 and R2, in a well-known manner. The motor is thus connected in full-series position.

Assuming that the vehicle propelled by the motor is operating at or above a predetermined speed, that the master controller has been returned to its off position, permitting all the switches to open, and is moved to its braking position; under these conditions, energy is first supplied from the B+ terminal of the battery B to energize the contact members that respectively engage control fingers 41 and 42. A circuit is thus established from the finger 41, through contact members 43 and 44 of the master reverser, conductor 45 and contact member 46 of the main reverser to the reversing coil 34, thereby throwing the reverser to the reversed position, without requiring the actuation of the master reverser. The purpose of the reversal of the series field or of the armature prior to establishing the regenerative connections is well known to those skilled in the art.

Upon actuation of the main reverser, a circuit is completed from the contact member 46, through conductor 47, interlock "R2 out," conductor 48, contact member 50 of the master controller, conductor 51, and the coils of the switches B1 and B2. The closure of these switches establishes a circuit from the energized control finger 42, through conductor 40, interlocks marked, respectively, "B1 in" and "B2 in," contact members of the differential relay switch D1 and of the limit switch A, and interlock marked "LS1-out," to the inverted valve magnet of the controller PK1. Another connection is also made from the contact member of the switch D1 through interlocks marked, respectively, "B1 in" and "B2 in," and conductor 52, to the coil of the standard valve magnet. The battery is thus connected across the field magnet winding F1 of the motor and the field-regulating resistance FR1, while the PK1 controller receives a step-by-step actuation, as hereinbefore explained, to gradually short-circuit the resistance FR1, thereby raising the voltage generated at the terminals of the motor.

The controller PK1 will continue to move step-by-step until the electro-motive force across the armature terminals reaches a predetermined value, which is in excess of the line voltage by an amount at least equal to the battery voltage, when the differential relay switch D1 will be raised. The coil of the PK controller standard valve magnet is thereupon momentarily deënergized, by reason of the exclusion of the differential relay switch contact member marked "D1 down" from its supply circuit. The controller PK1 is thus moved back toward its off position, in a manner hereinbefore explained.

The raising of the switch D1 also completes a circuit from the conductor 48, through a contact member marked "D1 up" and conductor 48ª to the coil of the line switch LS1 from conductor 48ª, through interlock "B2-in" to the coil of the switch and LS2, which are thus closed to complete regenerative connection to the line with the resistors R1 and R2 included in circuit.

The backward movement of the PK drum reinserts a certain amount of resistance in the field circuit, just at the time when the motor is connected to the line. This is particularly important, because the direction of current in the battery is immediately changed, since it is connected in series relation to the motor armature, by the braking current. The battery voltage is, therefore, suddenly raised and the field magnet winding F1 is, consequently, very much strengthened, and tends to suddenly increase the braking current. However, the inclusion of a predetermined amount of the field-regulating resistance FR1 serves to prevent any excessive rush of current.

Upon the closure of the line switches LS1 and LS2, two interlocks marked "LS1 in" are disposed in parallel relation to the portions of the control circuit that are adapted to be bridged by the contact members marked "D1 up" and "D1 down," respectively, and the low-current limit switch C is raised, thereby insuring the maintenance of the closure of the line switches and reënergizing the standard valve magnet coil. The inverted valve magnet coil however, is not energized at present, by reason of the opening of its circuit at the interlock marked "LS1-out."

The closure of the LS1 switch also completes a circuit, dependent upon the limit switch A, through the interlock marked "LS1-in" to the coils of the switches R1 and R2 in progression, as already explained in the case of acceleration, the resistors R1 and R2 being thus gradually excluded.

As soon as the switch R2 is closed, a circuit is established from a contact member 53 thereof, conductor 54, and interlock marked "LS1-in" to the coil of the inverted valve magnet of the controller PK1.

The two valve magnet coils of the controller PK1 being thus simultaneously energized, the field regulating resistance FR1 will be gradually short-circuited, dependent upon the limit switch A.

The Current Relay and the Battery Switch both remain open during regenerating operation by reason of the fact that the actuating coil of the Current Relay and the C. E. M. F. Cells are short-circuited by the closure of the switch B2.

Provided the supply circuit voltage remains substantially constant, then, as the speed of the vehicle decreases, the PK1 controller is gradually moved to its final position, wherein all the resistance FR1 is short-circuited. However, if the supply circuit voltage fluctuates considerably, as is usually unavoidable in trolley circuits of the class in question, then the direction of movement of the PK1 controller is governed by the relative values of the variations in voltage between the regenerated and the supply-circuit voltage, as will be understood. At a predetermined relatively low speed, the low-current limit switch C drops out, thereby deënergizing the coils of the line switches LS1 and LS2, to disconnect the motor from the line, opening all other switches and causing the controller PK1 to return to its off position.

It will thus be observed, that, during the accelerating or propelling period of the motor, the energy accumulator or storage battery is connected in series circuit with the motor and is adapted to be thus charged. The compressor motor is at times driven from the battery and at other times by the motor current or by a combination of motor and battery current. During regeneration, the battery is connected in parallel with the field magnet winding of the motor and the field-regulating resistor. In this way, a single battery performs both functions, and, by suitable design of parts, the battery will require little attention, but will be suitably charged and discharged during the accelerating and regenerating period of the motor.

The circuit connections, the arrangement of apparatus and the general type of control system may, of course, be varied within the spirit and scope of my invention. I, therefore, desire that only such limitations shall be imposed as are indicated in the appended claims.

I claim as my invention:

1. In a control system, the combination with a supply circuit, and an electric motor having an armature and a field magnet winding, of an energy-accumulating device, auxiliary translating means, means dependent upon predetermined conditions for selectively energizing said auxiliary means from said supply circuit and said accumulating device, and means dependent upon other predetermined conditions for energizing said field magnet winding from said accumulating device.

2. In a control system, the combination with a supply circuit, and an electric motor having an armature and a field magnet winding, of a field current-regulating device, energy-accumulating means, auxiliary translating means, electrical means in circuit with said motor under predetermined circuit conditions, means for connecting said auxiliary translating means in parallel with said electrical means, and means for connecting said electrical means in parallel with said field magnet winding and said current-regulating device.

3. In a control system, the combination with a supply circuit, and an electric motor having an armature and a field magnet winding, of auxiliary translating means, a field current-regulating device, an energy accumulator normally connected in series circuit with said motor and adapted to be charged, means for connecting said auxiliary translating means in parallel to said accumulator under predetermined conditions, electro-responsive means for causing said accumulator to discharge through said auxiliary translating means under other predetermined conditions, and means dependent upon still other predetermined conditions for causing said accumulator to discharge through said field-magnet winding and said current-regulating device.

4. In a control system, the combination with a supply circuit, and an electric motor having an armature and a field magnet winding, of auxiliary translating means, a field-regulating resistor, an energy accumulator normally connected in series circuit with said motor and adapted to be charged, means for connecting said auxiliary translating means in parallel with said accumulator and electro-responsive means for causing said accumulator to discharge through said auxiliary translating means under predetermined conditions during motor acceleration, and means for connecting said accumulator in parallel with the field magnet winding and said resistor and for regulating the resistor when the motor is acting as a braking generator.

5. In a control system, the combination with a supply circuit, and an electric motor having an armature and a field magnet winding, of auxiliary translating means, a field-regulating resistor, an energy accumulator normally connected in series circuit with said motor and adapted to be charged, means for connecting said auxiliary translating means in parallel with said accumulator and electro-responsive means for causing said accumulator to discharge through said auxiliary translating means under predetermined conditions during motor acceleration, means in parallel circuit with said accumulator for controlling the accumulator current, and means for connecting said accumulator in parallel with the field magnet winding and said resistor and for regulating the resistor when the motor is acting as a braking generator.

6. In a control system, the combination with a supply circuit, and an electric motor having an armature and a field magnet winding, of auxiliary translating means, a field-regulating resistor, an energy accumulator normally in circuit with said motor, means for connecting said auxiliary translating means in parallel with said accumulator and electro-responsive means for causing said accumulator to discharge through said auxiliary translating means under predetermined conditions during motor acceleration, a counter-electromotive force battery in parallel circuit with said accumulator for controlling the accumulator current, and means for automatically regeneratively connecting the motor to the supply circuit with the accumulator in parallel with the field-magnet winding and the field-regulating resistor when a predetermined voltage relation exists between the motor armature and the supply circuit.

7. In a control system, the combination with a supply circuit, and an electric motor having an armature and a field magnet winding, of a field-regulating resistor, a storage battery normally in series circuit with said motor, auxiliary translating means, means for connecting said last means in parallel with said storage battery and electro-responsive means for causing said battery to discharge through said auxiliary translating means under predetermined conditions during motor acceleration, a regulatable counter-electromotive force battery in parallel circuit with said storage battery for controlling the storage battery current, means for automatically regeneratively connecting the motor to the supply circuit with the storage battery in parallel with the field magnet winding and the field-regulating resistor when a predetermined voltage relation exists between the motor armature and the supply circuit, and means for varying the field-regulating resistor in accordance with variations in motor-speed or supply-circuit voltage.

8. In a control system, the combination with a supply circuit, and an electric motor having an armature and a field magnet winding, of a field-regulating resistor, a translating device, a storage battery normally in circuit with said motor, an auxiliary fluid pressure system, means for connecting said auxiliary translating device in parallel with said battery in accordance with predetermined conditions of pressure of said system and selective means for causing said source of energy or said battery to supply said translating device during motor acceleration, and means for automatically regeneratively connecting the motor to the supply circuit with the battery in parallel with the field magnet winding and the field-regulating resistor when a predetermined voltage relation exists between the motor armature and the supply circuit.

9. In a control system, the combination with a supply circuit and an electric motor having an armature and a field magnet winding, of a field-regulating resistor, a storage battery, a fluid-pressure system, a motor-driven compressor associated therewith, means for connecting the storage battery in series with said motor when the motor is accelerating and for disconnecting the battery when the motor is not in operation, means dependent upon a predetermined condition of said pressure system for connecting the compressor motor in parallel with said battery during conditions of motor acceleration, means dependent upon a low-pressure condition for making said connection irrespective of the conditions of motor operation, means for automatically regeneratively connecting the motor to the supply circuit with the storage battery in parallel with the field-magnet winding and the field-regulating resistor when a predetermined voltage relation exists between the motor armature and the supply circuit, and means for varying the field-regulating resistor in accordance with variations in motor-speed or supply circuit voltage.

In testimony whereof, I have hereunto subscribed my name this 17th day of July 1914.

NORMAN W. STORER.

Witnesses:
F. E. WYNNE,
B. B. HINES.

Copies of this patent may be obtained for five cents each, by addressing the "Commissioner of Patents, Washington, D. C."